(12) United States Patent
Hakamata et al.

(10) Patent No.: US 10,706,163 B2
(45) Date of Patent: Jul. 7, 2020

(54) ENCRYPTION SYSTEM, ENCRYPTION METHOD AND ENCRYPTION DEVICE

(71) Applicant: FUJITSU LIMITED, Kawasaki-shi, Kanagawa (JP)

(72) Inventors: Junki Hakamata, Yokohama (JP); Masahiro Kataoka, Kamakura (JP); Yukari Hakamata, Yokohama (JP); Tomoyoshi Ohsawa, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 128 days.

(21) Appl. No.: 15/717,013

(22) Filed: Sep. 27, 2017

(65) Prior Publication Data

US 2018/0101687 A1 Apr. 12, 2018

(30) Foreign Application Priority Data

Oct. 6, 2016 (JP) .................. 2016-198455

(51) Int. Cl.
*G06F 21/60* (2013.01)
*G06F 21/62* (2013.01)
*G09C 1/00* (2006.01)
*G06F 21/84* (2013.01)
*H04N 1/32* (2006.01)

(52) U.S. Cl.
CPC .......... *G06F 21/608* (2013.01); *G06F 21/602* (2013.01); *G06F 21/6245* (2013.01); *G06F 21/84* (2013.01); *G09C 1/00* (2013.01); *H04L 2209/16* (2013.01); *H04N 1/32101* (2013.01); *H04N 2201/3205* (2013.01); *H04N 2201/3281* (2013.01)

(58) Field of Classification Search
USPC ........ 713/189, 150, 163, 181; 726/2, 21, 36; 380/255, 264, 276
See application file for complete search history.

(56) References Cited

U.S. PATENT DOCUMENTS

| | | | | |
|---|---|---|---|---|
| 2006/0085737 | A1* | 4/2006 | Liu | H03M 7/30 715/234 |
| 2013/0181851 | A1* | 7/2013 | Kataoka | H03M 5/02 341/52 |
| 2015/0317483 | A1* | 11/2015 | Mori | G06F 21/602 713/153 |

FOREIGN PATENT DOCUMENTS

| | | |
|---|---|---|
| JP | 2009-87160 | 4/2009 |
| JP | 2015-41319 | 3/2015 |
| WO | WO 2014/092180 A1 | 6/2014 |

\* cited by examiner

*Primary Examiner* — Sharif E Ullah
(74) *Attorney, Agent, or Firm* — Xsensus LLP (57) ABSTRACT

An encoding unit encodes at least a part of items of a CSV file including a plurality of records having a plurality of items with a unit of items of respective records. A creation unit creates an encrypted dictionary in which an encoded dictionary having been used for the encoding is encrypted with a unit of dictionary. A transmission unit sends, according to a request for a part of records included in the data, encoded data including the encoded part of records and the encrypted dictionary to a requesting source. A requesting unit requests a part of records included in the CSV file. A decryption unit decrypts the encoded data received according to the request by using the encrypted dictionary.

6 Claims, 7 Drawing Sheets

```
EMPLOYEE NUMBER,  NAME,             SEX,   MY NUMBER,  ···
150001,            TANAKA TARO,      MALE,  123456···,  ···
150002,            SUZUKI JIRO,      MALE,  987654···,  ···
150003,            YAMADA SABURO,    MALE,  456789···   ···
...                ...
```

FIG.4

```
EMPLOYEE NUMBER,   NAME,            SEX,    MY NUMBER,  ...
150001,            TANAKA TARO,     MALE,   1A...,      ...
150002,            SUZUKI JIRO,     MALE,   1B...,      ...
150003,            YAMADA SABURO,   MALE,   1C...,      ...
...                ...
```

FIG.5

| CODE | VALUE |
|------|-------|
| 1A | 123456... |
| 1B | 987654... |
| 1C | 456789... |

ENCRYPTION SYSTEM, ENCRYPTION METHOD AND ENCRYPTION DEVICE

CROSS-REFERENCE TO RELATED APPLICATIONS

This application is based upon and claims the benefit of priority of the prior Japanese Patent Application No. 2016-198455, filed on Oct. 6, 2016, the entire contents of which are incorporated herein by reference.

FIELD

The embodiments discussed herein are related to an encryption system, an encryption method, an encryption device, and a computer-readable recording medium.

BACKGROUND

In recent years, for example, highly confidential information such as My Number (individual number) is increasing, and such information is thought to increase even more in the future. In Japan, My number is a social number issued for each individual based on the Social Security and Tax Number System. Various types of information related to an individual is associated with his/her My Number. Therefore, My Number is confidential information that any leakage thereof ought to be avoided. Accordingly, in the future, it is predicted that there will be a demand for technologies for keeping confidential information secret, with confidentiality even higher than that of conventional technologies. Generally, when a file including confidential information is kept secret, it is conceived that the entire file is encrypted.

However, when a file including confidential information is used, there are cases where displaying and writing of the confidential information are not necessary. For example, when a withholding certificate is used as an income verification, due to the law, his or her My Number is not written on the withholding certificate. In this case, the information of the My Number does not need to be decrypted, and the risk of information leakage is increased if such information is decrypted.

Further, in a case where the entire file including confidential information of a plurality of users is encrypted, when confidential information of any of the users is used, the entire file needs to be decrypted, so that the risk of information leakage is increased. For example, in a case where the entire file including confidential information of one hundred users is encrypted, when confidential information of only one specific user is used, confidential information of the rest of ninety-nine users is also decrypted, so that the risk of information leakage is increased.

SUMMARY

According to an aspect of an embodiment, an encryption system includes an encryption device and a decryption device. An encryption device includes an encoding unit that encodes at least a part of items of data including a plurality of records having a plurality of items with a unit of items of respective records, a creation unit that creates an encrypted dictionary in which a dictionary having been used for the encoding performed by the encoding unit is encrypted with a unit of dictionary, and a transmission unit that transmits, according to a request for a part of records included in the data, the encoded part of records and the encrypted dictionary to a requesting source. A decryption device includes a requesting unit that requests a part of records included in the data to the encryption device, and a decryption unit that decrypts the part of records received from the encryption device according to the request from the requesting unit by using the encrypted dictionary.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENT(S)

Preferred embodiments of the present invention will be explained with reference to accompanying drawings. The scope of rights of the present application is not limited to the embodiments. The respective embodiments can be combined with one another within a range that processing contents thereof are not contradictory.

[a] First Embodiment

Outline of Processes

Figure 1:
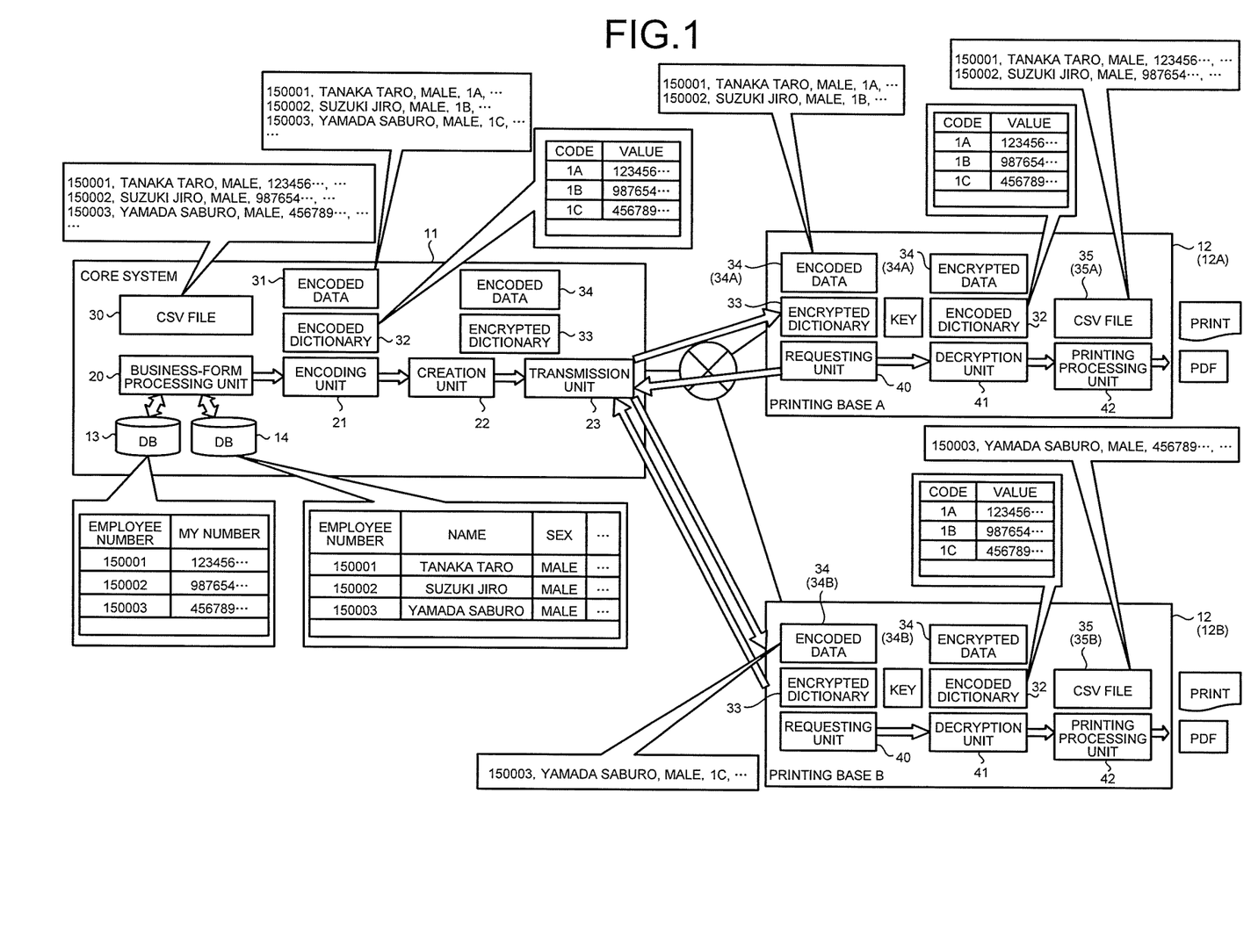
FIG. 1 is a diagram schematically illustrating a flow of printing a business form.

First, with reference to FIG. 1, an outline of encoding and decrypting of a text file including confidential information is described. In the following descriptions, a case of applying the present invention to a system of printing business forms is described as an example. FIG. 1 is a diagram schematically illustrating a flow of printing a business form. In FIG. 1, a core system 11 and two printing bases 12 (12A, 12B) are illustrated. The core system 11 includes a DB (database) 13 having confidential information stored therein and a DB 14 having information other than confidential information stored therein. In DB 13, My Numbers of employees are stored as these My Numbers are associated with employee numbers and as confidential information. In the DB 14, information such as the names and sexes of employees are stored as these pieces of information are associated with employee numbers.

The core system 11 includes a business-form processing unit 20, an encoding unit 21, a creation unit 22, and a transmission unit 23. The business-form processing unit 20 creates business-form data used for printing business forms. For example, the business-form processing unit 20 creates, as business-form data, text data such as a CSV (comma-separated values) file including a plurality of having data of a plurality of items to be printed on a business form. The CSV file is a text file using commas "," for delimiters that delimit information of respective items when pieces of information of a plurality of items are listed. The CSV file is widely used as text data for expressing a table structure, and as an input/output format of a variety of applications such as spreadsheets, databases, and business forms. For example, the business-form processing unit 20 creates, as business-form data related to employees, a CSV file 30 having stored therein data of respective items such as employee numbers, names, sexes, and My Numbers.

The CSV file 30 includes data of My Numbers. My Numbers are confidential information that any leakage thereof ought to be avoided. When the CSV file 30 is transmitted as it is as business-form data to the printing bases 12, the risk of leakage of the data of My Numbers of respective employees is increased.

Therefore, the encoding unit 21 encodes at least a part of items in the CSV file 30 with the unit of items of respective records. For example, the encoding unit 21 encodes the items of My Numbers in the CSV file 30 with the unit of items of respective records. For example, the encoding unit 21 creates encoded data 31 and an encoded dictionary 32 in which the items of My Numbers in the CSV file 30 are encoded with the unit of word or of numeral. For example, the encoding unit 21 creates the encoded dictionary 32 in which the items of My Numbers are encoded with the unit of numeral and that is associated with the items of My Numbers. Subsequently, based on the encoded dictionary 32, the encoding unit 21 creates the encoded data 31 in which data of the items of My Numbers is encoded. As for items other than the items of My Numbers, the encoded dictionary 32 can be created for each of the items so as to encode data. For example, it is possible that a code is allocated to the data of a part of items so that the data becomes unique with the unit of items so as to encode the data, and that an encoded dictionary 32 in which a code allocated with the unit of items and data are associated with each other is created.

The creation unit 22 encrypts the encoded dictionary 32 corresponding to the items of My Numbers with an encryption key. When the encoding unit 21 encodes a plurality of items respectively with a corresponding unit of items, it is possible to create an encrypted dictionary 33 in which encoded dictionaries 32 created with the unit of items are encrypted with different encryption keys.

The transmission unit 23 transmits, according to a request from the printing bases 12, data to the printing base 12 of a requesting source. For example, the transmission unit 23 receives, from the printing bases 12, a transmission request for data including identification information of employees who are output subjects to a business form. As for the identification information of employees who are output subjects to a business form, any information can be specified as far as the information can identify each of the employees, such as employee numbers or names. The transmission unit 23 extracts, according to a request, a record of an output-subject employee from the encoded data 31, and transmits encoded data 34 in which the extracted record is stored and the encrypted dictionary 33 to the request source. Further, the transmission unit 23 transmits a decryption key corresponding to an encryption key in which the encrypted dictionary 33 is encrypted to the printing bases 12. When the printing bases 12 have a decryption key stored therein or the decryption key can be acquired separately, the decryption key does not need to be transmitted to the printing bases 12.

The printing bases 12 perform printing of business forms. For example, the printing bases 12 are offices where respective employees work, and business forms of employees belonging to each office are printed there. Each of the printing bases 12 includes a requesting unit 40, a decryption unit 41, and a printing processing unit 42.

The requesting unit 40 requests the core system 11 for transmission of data of employees, who are output subjects of a business form. For example, the requesting unit 40 transmits, to the core system 11, a transmission request for data including identification information of output-subject employees of a business form. In the example of FIG. 1, the requesting unit 40 of the printing base 12A transmits a transmission request for data to the core system 11, as "TANAKA TARO" and "SUZUKI JIRO" are designated as the output-subject employees of a business form. The requesting unit 40 of the printing base 12B transmits a transmission request for data to the core system 11, as "YAMADA SABURO" is designated as the output-subject employee of a business form. Due to this process, encoded data 34A including the records of "TANAKA TARO" and "SUZUKI JIRO" and the encrypted dictionary 33 are transmitted from the core system 11 to the printing base 12A. Encoded data 34B including the record of "YAMADA SABURO" and the encrypted dictionary 33 are transmitted from the core system 11 to the printing base 12B. The encrypted dictionary 33 is still encrypted with an encryption key at this stage. Therefore, My Numbers is not decrypted.

The decryption unit 41 decrypts the records included in the encoded data 34 received from the core system 11 by using the encrypted dictionary 33. For example, when a My Number is the item to be output, the decryption unit 41 decompresses the encrypted dictionary 33 to the encoded dictionary 32 by using a decryption key. In the example of FIG. 1, the decryption units 41 of the printing bases 12A and 12B both decompress the encrypted dictionary 33 to the encoded dictionary 32. Subsequently, the decryption units 41 decrypt the encoded data 34 to a CSV file 35 by using the decompressed encoded dictionary 32. For example, the decryption units 41 decrypt, by using the decompressed encoded dictionary 32, a code of the item of the My Number in the record included in the encoded data 34 received from the core system 11 to a My Number corresponding to the code. In the example of FIG. 1, the decryption unit 41 of the printing base 12A decrypts the encoded data 34A including the records of "TANAKA TARO" and "SUZUKI JIRO" to a CSV file 35A. The decryption unit 41 of the printing base 12B decrypts the encoded data 34B including the records of "YAMADA SABURO" to a CSV file 35B. Meanwhile, when My Numbers are not the items needed to be output, the decryption units 41 do not decrypt the encrypted dictionary 33. For example, when a withholding certificate is used as an income verification, there is a regulation that his or her My Number is not written on the withholding certificate. In this case, the decryption units 41 do not decrypt the encrypted dictionary 33. Further, for example, the decryption units 41 set the encoded data 34 as it is as the CSV file 35. Due to this configuration, at the printing bases 12, when My Numbers are not the items needed to be output, the encoded dictionary 32 is not decompressed, so that the data of the My Numbers can be protected.

The printing processing unit 42 creates printing data by using the decrypted CSV file 35 to print business forms. The printing processing unit 42 can create and output printing image data such as a PDF (Portable Document Format) by using the decrypted CSV file 35.

For example, when My Numbers are not the items to be output, such as a case where employee's withholding certificates are printed for the use as their income verifications, the items of the My Numbers are in an encrypted state, so that the My Numbers are not printed properly. On the other hand, when My Numbers are the items to be output, the data of the My Numbers are decrypted to the CSV file 35 by the decryption unit 41, so that the My Numbers are printed properly. In this manner, data of My Numbers can be protected in a flexible manner by using the same encoded data 34. When My Numbers are not printed, the encoded dictionary 32 is in an encrypted state. Therefore, in this case, data of My Numbers cannot be decompressed. Due to this configuration, for example, in a state of risk where temporary data of applications not to be printed can be accessed, the data of My Numbers that are not to be printed can be protected. That is, it is not a configuration of simply switching display and non-display of the data of My Numbers at the time of printing.

Further, in the CSV file 30, only data of records of employees who are designated at the printing bases 12 as output subject to a business form is transmitted to the printing bases 12. Due to this configuration, at the printing bases 12, even when the encoded dictionary 32 is used, as for employees other than the employees designated as the output subjects, My Numbers thereof cannot be collated. That is, My Numbers of employees other than the employees designated as the output subjects stored in the encoded dictionary 32 cannot be associated with any employees, and thus become meaningless data. Therefore, the risk of information leakage can be suppressed. By encoding data with the unit of items of the CSV file 30 and encrypting the encoded dictionary 32 as described above, data can be protected with the unit of items of the CSV file 30. Further, among the records of the CSV file 30, by transmitting only a part of records that is designated as the output subjects, data can be protected with the unit of records of the CSV file 30.

Device Configuration

Figure 2:
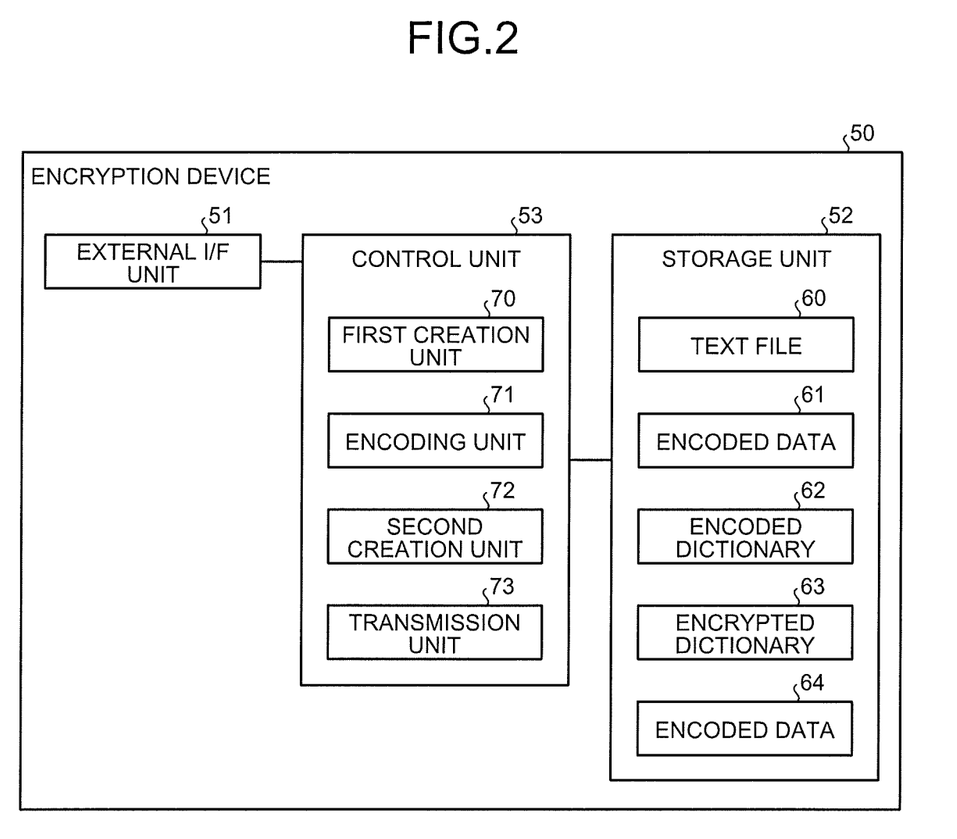
FIG. 2 is a diagram illustrating an example of a configuration of an encryption device.

Next, configurations of respective devices are described. First, a configuration of an encryption device 50 is described. FIG. 2 is a diagram illustrating an example of a configuration of the encryption device 50. The encryption device 50 is a device that performs compression, encryption, encoding, and the like. The encryption device 50 is, for example, a computer such as a personal computer and a server computer, or an information processing device such as a tablet terminal and a smartphone. For example, in the example of FIG. 1, the encryption device 50 is a computer that operates as the core system 11. The encryption device 50 can be implemented as one computer, or can be implemented as a cloud formed of a plurality of computers. In the present embodiment, a case of implementing the encryption device 50 as one computer is described as an example. As illustrated in FIG. 2, the encryption device 50 includes an external I/F (interface) unit 51, a storage unit 52, and a control unit 53. The encryption device 50 can also include devices other than the devices mentioned above that are included in a computer or an information processing device.

The external I/F unit 51 is, for example, an interface that transmits and receives various types of information to and from other devices. The external I/F unit 51 is a port that inputs and outputs data with respect to a storage medium such as a flash memory, a communication port that performs wired communication through a cable or the like, or a communication interface that performs wireless communication.

The storage unit 52 is a storage device such as a hard disk, an SSD (Solid State Drive), and an optical disk. The storage unit 52 can be a data-rewritable semiconductor memory such as a RAM (Random Access Memory), a flash memory, and an NVSRAM (Non Volatile Static Random Access Memory).

The storage unit 52 stores therein an OS (Operating System) or various programs executed by the control unit 53. For example, the storage unit 52 stores therein a program for an encryption process described later. Further, the storage unit 52 stores various types of data used for a program executed by the control unit 53. For example, the storage unit 52 stores therein a text file 60, encoded data 61, an encoded dictionary 62, an encrypted dictionary 63, and encoded data 64.

The text file 60 is data in which various types of information of an encoding subject are stored. For example, the text file 60 includes a plurality of records formed of a plurality of items delimited by a delimiter, such as the CSV file 30 illustrated in FIG. 1. For example, records including data of a plurality of items to be printed on a business form are stored in the text file 60.

Figure 3:
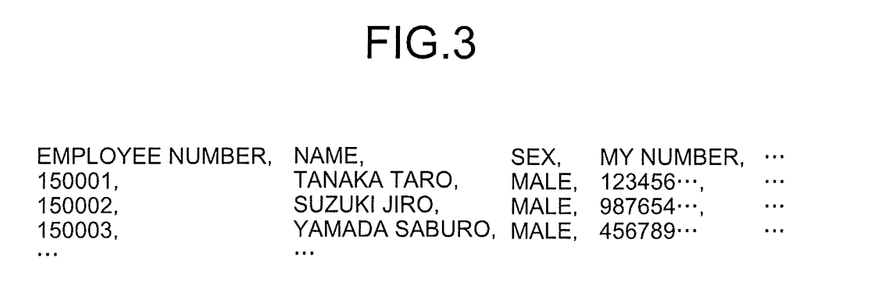
FIG. 3 is a diagram illustrating an example of a text file.

FIG. 3 is a diagram illustrating an example of the text file 60. In FIG. 3, records including items of "EMPLOYEE NUMBER", "NAME", "SEX", AND "MY NUMBER" as items of business-form data are illustrated in plural. In the text file 60 illustrated in FIG. 3, as an employee number "150001", a name "TANAKA TARO", a sex "MALE", and a My Number "123456 . . . " are stored. Also in the text file 60, as an employee number "150002", a name "SUZUKI JIRO", a sex "MALE", and a My Number "987654 . . . " are stored, and as an employee number "150003", a name "YAMADA SABURO", a sex "MALE", and a My Number "456789 . . . " are stored.

The encoded data 61 is data in which data of respective items of the text file 60 is encoded by the encoded dictionary 62. For example, the encoded data 61 corresponds to the encoded data 31 in the example of FIG. 1.

Figure 4:
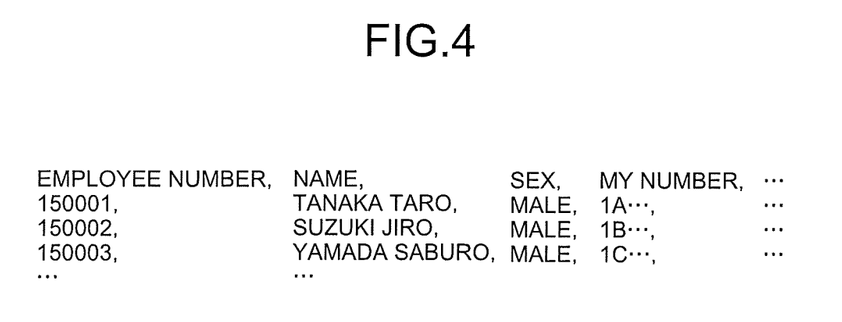
FIG. 4 is a diagram illustrating an example of encoded data.

FIG. 4 is a diagram illustrating an example of the encoded data 61. In the encoded data 61 illustrated in FIG. 4, respective pieces of data of the item "My Number" in the text file 60 are encoded. For example, the My Number "123456 . . . " of the employee number "150001" is encoded as "1A", the My Number "987654 . . . " of the employee number "150002" is encoded as "1B", and the My Number "456789 . . . " of the employee number "150003" is encoded as "1C".

The encoded dictionary 62 is data of a dictionary used for encoding and decrypting of data. For example, the encoded dictionary 62 corresponds to the encoded dictionary 32 in the example of FIG. 1. In the present embodiment, when data of a plurality of items delimited by a delimiter of the text file 60 is encoded, the encoding is performed by switching the encoded dictionary 62 for each one item or a plurality of items. For example, as for items in which confidential information of the text file 60 is stored, encoding is performed by switching the encoded dictionary 62 for each one item. As for items that are not confidential information of the text file 60, encoding is performed by the same encoded dictionary 62 for a plurality of items. The encoded dictionary 62 stores therein a code corresponding to the data of respective items for each of the encoding items. For example, the encoded dictionary 62 stores therein a dynamically allocated code for each of the encoding items, with the unit of word or numeral appearing on each item and corresponding to the characteristics of the unit of word or numeral. For example, a short code is allocated to a word or numeral with a high appearance frequency, and the encoded dictionary 62 stores therein a dynamically allocated code. When a pattern of appearing character strings or numerals is within a certain pattern in each of the encoding items, in the encoded dictionary 62, the certain pattern and a code can be stored in advance while these elements are associated with each other. Further, item information indicating encoded items can be included in the encoded dictionary 62.

Figure 5:
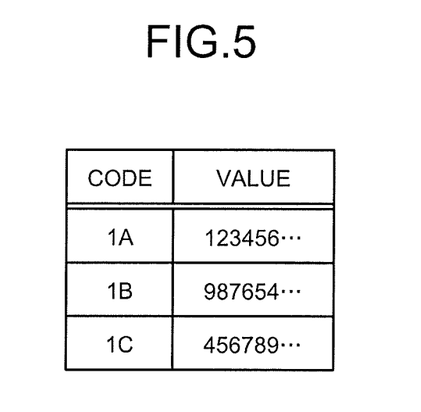
FIG. 5 is a diagram illustrating an example of an encoded dictionary.

FIG. 5 is a diagram illustrating an example of the encoded dictionary 62. In the encoded dictionary 62 illustrated in FIG. 5, each data of the item "MY NUMBER" illustrated in FIG. 3 and each code of the item "MY NUMBER" in the encoded data 61 illustrated in FIG. 4 are associated with each other and stored in the items of "CODE" and "VALUE". For example, "1A" in "CODE" is associated with "123456 . . . " in "VALUE" and stored in the encoded dictionary 62. Further, "1B" in "CODE" is associated with "987654 . . . " in "VALUE" and stored in the encoded dictionary 62, and "1C" in "CODE" is associated with "456789 . . . " in "VALUE" and stored in the encoded dictionary 62.

The encrypted dictionary 63 is data in which the encoded dictionary 62 is encrypted. For example, the encrypted dictionary 63 is data in which the encoded dictionary 62 corresponding to the items of confidential information is encrypted.

The encoded data 64 is data created by extracting records corresponding to a request from the encoded data 61. For example, the encoded data 64 corresponding to the encoded data 34 in the example of FIG. 1. The data structure of the encoded data 64 is identical to that of the encoded data 61, and thus detailed descriptions thereof will be omitted.

The control unit 53 is a device that controls the encryption device 50. As the control unit 53, an electronic circuit such as a CPU (Central Processing Unit) and an MPU (Micro Processing Unit) or an integrated circuit such as an ASIC (Application Specific Integrated Circuit) and an FPGA (Field Programmable Gate Array) can be employed. The control unit 53 includes an internal memory that stores therein programs in which various process procedures are defined and control data, and performs various processes by using such programs and control data. As various programs are operated, the control unit 53 functions as various processing units. For example, the control unit 53 includes a first creation unit 70, an encoding unit 71, a second creation unit 72, and a transmission unit 73.

The first creation unit 70 creates the text file 60 including a plurality of records in which data of a plurality of items is delimited by a delimiter. The first creation unit 70 corresponds to the business-form processing unit 20 in the example of FIG. 1. The text file 60 can be a text file created by other devices.

The encoding unit 71 encodes data of respective items in the text file 60 with an encoding method corresponding to each item. The encoding unit 71 corresponds to the encoding unit 21 in the example of FIG. 1. The encoding unit 71 encodes at least a part of items in the text file 60 with the unit of items of each record. For example, the encoding unit 71 creates the encoded data 61 in which data in the text file 60 is encoded and the encoded dictionary 62. For example, the item of "My Number" designated as confidential information is set to be an encoding-subject item. For example, the encoding unit 71 allocates a code to the data of the encoding-subject item in the text file 60, and then associates the code and data to which the code is allocated and registers the associated elements in the encoded dictionary 62 corresponding to the item. As for the code, an appearance frequency with respect to a word or numeral included in the data of respective items is calculated, and a short code is allocated to a word or numeral having a high appearance frequency. When a pattern of appearing character strings or numerals is within a certain pattern, in the encoded dictionary 62, the certain pattern and a code can be stored in advance while these elements are associated with each other. Further, the encoding unit 71 can allocate codes in order from a short code each time different data appears. The encoding unit 71 then converts data of encoding-subject items in the text file 60 into a code by using the encoded dictionary 62 to create encoded data 61 in which data has been converted into a code. For example, when a word or numeral is included in the data of encoding-subject items in the text file 60, the encoding unit 71 converts the data into a code corresponding to the word or numeral stored in the encoded dictionary 62.

The encoding unit 71 can include item information indicating encoded items in the encoded dictionary 62. In this case, it is possible to configure that the encoding unit 71 allocates a code so that the code becomes unique to each of encoding items, and registers the code in the encoded dictionary 62 corresponding to the items. That is, when there are a plurality of encoding-subject items, it is permissible that the same code is overlapped in the items. For example, the encoding unit 71 allocates a code so that, as for each of the encoding-subject items, the code becomes unique to the data of corresponding items, and registers the code in the encoded dictionary 62 corresponding to the items. As for the code, an appearance frequency with respect to a word or numeral included in the data is calculated for each of the encoding-subject items, and a short code is allocated to a word or numeral having a high appearance frequency. By allocating a code so that the code becomes unique to each of the encoding-subject items, it is possible that a short code is allocated to each of the encoding-subject items in an overlapping manner, and thus encoding of data can be performed with a high compression ratio for each of the encoding-subject items. When a pattern of appearing character strings or numerals is within a certain pattern in each of the encoding items, in the encoded dictionary 62 corresponding to encoding-subject items, the certain pattern and a code can be stored in advance while these elements are associated with each other. Further, the encoding unit 71 can allocate codes in order from a short code in each of the encoding-subject items, each time different data appears. The encoding unit 71 can delete the text file 60 after creating the encoded data 61.

The second creation unit 72 creates the encrypted dictionary 63 in which the encoded dictionary 62 is encrypted. The second creation unit 72 corresponds to the creation unit 22 in the example of FIG. 1. For example, the second creation unit 72 individually encrypts encoded dictionaries 62 corresponding to items in which confidential information is stored. Encryptions keys can be created while complying to a predetermined rule at the time of encrypting the encoded dictionaries 62, or can be set in advance. Further, the second creation unit 72 can encrypt the encoded dictionaries 62 also for items other than items in which confidential information is stored.

The transmission unit 73 transmits, according to a request, a part of encoded records and the encrypted dictionary 63 to a requesting source. The transmission unit 73 corresponds to the transmission unit 23 in the example of FIG. 1. For example, the transmission unit 73 receives, from the printing bases 12, a transmission request for data specifying output-subject employees of a business form, such as data indicating employee numbers, names, and departments the employees belong to. According to a request, the transmission unit 73 transmits to the requesting source the encoded data 64 in which records of employees designated as output subjects among the encoded data 61 are stored and the encrypted dictionary 63. For example, the transmission unit 73 extracts corresponding records from the encoded data 61, and creates the encoded data 64 based on the extracted records. Subsequently, the transmission unit 73 transmits the encoded data 64 and the encrypted dictionary 63 to the printing bases 12 of the requesting source. The transmission unit 73 then transmits, to the printing bases 12, a decryption key corresponding to an encryption key with which the encrypted dictionary 63 is encrypted. When the printing bases 12 store therein the decryption key or when the decryption key can be acquired separately, the decryption key does not need to be transmitted to the printing bases 12. In the example of FIG. 1, in the encoded data 31, the items of "EMPLOYEE NUMBER" and "NAME" are not encoded. Accordingly, the records of output-subject employees can be easily extracted from the encoded data 31.

Figure 6:
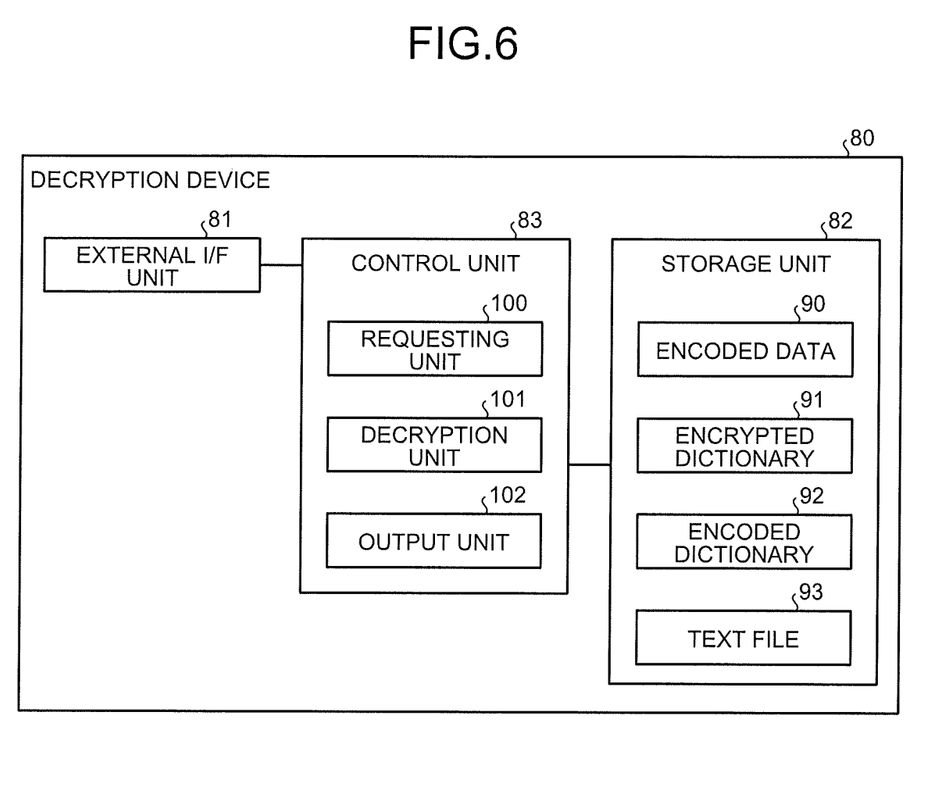
FIG. 6 is a diagram illustrating an example of a configuration of a decryption device.

Next, a configuration of a decryption device 80 is described. FIG. 6 is a diagram illustrating a configuration of the decryption device 80. The decryption device 80 is a device that performs compression and decryption of encrypted data. The decryption device 80 is, for example, a computer such as a personal computer and a server computer, or an information processing device such as a tablet terminal and a smartphone. For example, in the example of FIG. 1, the decryption device 80 is a computer that decrypts data at the printing bases 12. The decryption device 80 can be implemented as one computer, or can be implemented as a cloud formed of a plurality of computers. In the present embodiment, a case of implementing the decryption device 80 as one computer is described as an example. As illustrated in FIG. 6, the decryption device 80 includes an external I/F unit 81, a storage unit 82, and a control unit 83. The decryption device 80 can also include devices other than the devices mentioned above that are included in a computer or an information processing device.

The external I/F unit 81 is, for example, an interface that transmits and receives various types of information to and from other devices. The external I/F unit 81 is a port that inputs and outputs data with respect to a storage medium such as a flash memory, a communication port that performs wired communication through a cable or the like, or a communication interface that performs wireless communication.

The storage unit 82 is a storage device such as a hard disk, an SSD, and an optical disk. The storage unit 82 can be a data-rewritable semiconductor memory such as a RAM, a flash memory, and an NVSRAM.

The storage unit 82 stores therein an OS or various programs executed by the control unit 83. For example, the storage unit 82 stores therein a program for a decryption process described later. Further, the storage unit 82 stores various types of data used for a program executed by the control unit 83. For example, the storage unit 82 stores therein encoded data 90, an encrypted dictionary 91, an encoded dictionary 92, and a text file 93.

The encoded data 90 is data in which encoded data having records of output-subject employees received from the encryption device 50 stored therein is stored. For example, the encoded data 90 corresponds to the encoded data 34 in the example of FIG. 1.

The encrypted dictionary 91 is an encrypted dictionary having an encrypted dictionary 63 designated as an output subject received from the encryption device 50 stored therein. For example, the encrypted dictionary 91 corresponds to the encrypted dictionary 33 in the example of FIG. 1.

The encoded dictionary 92 is an encoded dictionary having data in which the encrypted dictionary 91 is decrypted stored therein. For example, the encoded dictionary 92 corresponds to the encoded dictionary 32 in the example of FIG. 1. When the encrypted dictionary 91 is decrypted with a legitimate decryption key, the encoded dictionary 92 is decompressed in the same manner as the encoded dictionary 62.

The text file 93 is a text file in which data created by decrypting the encoded data 90 by the encoded dictionary 92 is stored. For example, the text file 93 corresponds to the CSV file 35 in the example of FIG. 1. When the encrypted dictionary 91 is decrypted with a legitimate decryption key, the data encoded in the text file 93 is decompressed as original data.

The control unit 83 is a device that controls the decryption device 80. As the control unit 83, an electronic circuit such as a CPU and an MPU or an integrated circuit such as an ASIC and an FPGA can be employed. The control unit 83 includes an internal memory that stores therein programs in which various process procedures are defined and control data, and performs various processes by using such programs and control data. As various programs are operated, the control unit 83 functions as various processing units. For example, the control unit 83 includes a requesting unit 100, a decryption unit 101, and an output unit 102.

The requesting unit 100 requests transmission of data as an output subject of a business form to the encryption device 50. The requesting unit 100 corresponds to the requesting unit 40 in the example of FIG. 1. For example, the requesting unit 100 notifies the encryption device 50 of the employees who are the output subjects of a business form and requests the records of the employees as output subjects of a business form included in the text file 60. Due to this configuration, encoded data having stored therein the records of employees designated as output subjects and the encrypted dictionary 33 are transmitted from the encryption device 50. The requesting unit 100 stores encoded data having stored therein the records of employees designated as output subject and received from the encryption device 50 in the storage unit 82 as the encoded data 90. Further, the requesting unit 100 stores the encrypted dictionary 33 received from the encryption device 50 in the storage unit 82 as the encrypted dictionary 91.

The decryption unit 101 decrypts the encoded data 90 by using the encrypted dictionary 91. The decryption unit 101 corresponds to the decryption unit 41 in the example of FIG. 1. For example, when the items of confidential information included in the encoded data 90 are items of output subjects, the decryption unit 101 decompresses the encrypted dictionary 91 to the encoded dictionary 92 by using a decryption key. The decryption key can be input by a user, a decryption key transmitted from the encryption device 50 can be used therefor, and the decryption key can be acquired from a device having stored therein decryption keys of respective items, for respective users according to the authority of each user. Subsequently, the decryption unit 41 converts, by using the decompressed encoded dictionary 92, codes of items of confidential information of records included in the encoded data 90 into data corresponding to each code, and records included in the encoded data 90 are output to the text file 93.

Meanwhile, when the items of confidential information are items that are not needed to be output, the decryption unit 101 does not decrypt the encrypted dictionary 91. For example, as for the items that are not needed to be output, the decryption unit 101 leave the codes of these items as they are, and outputs the records of the encoded data 90 to the text file 93. When there is no data corresponding to the codes, the decryption unit 101 can output these codes after converting them into specific characters, or output these codes after converting them into blank.

The output unit 102 uses the text file 93 to perform various types of outputting. The output unit 102 corresponds to the printing processing unit 42 in the example of FIG. 1. For example, the output unit 102 creates printing data by using the text file 93 and prints business forms. The output unit 102 can output the created text file 93 to other programs and other devices.

Conventionally, for example, when a file including confidential information is kept secret, encryption of the entire file is conceivable. For example, there is conceived a method in which a CSV file is compressed to be a Zip file by using a compression format such as a Zip format, and the compressed file is encrypted. However, if the entire file is encrypted, at the time of decrypting the file, all the pieces of information in the file are decrypted, and there is a risk of information leakage.

Further, for example, there is conceived a method of encrypting a CSV file for each record. However, if a CSV file is encrypted for each record, at the time of using an encrypted file, all rows to be used need to be decrypted, and thus the processing speed becomes slow. Further, if the CSV file is encrypted for each record, separate keys need to be prepared for all the rows, and thus this method is not a realistic option for data having a large number of records. Further, in this method, compression of the CSV file is made after encryption, and thus the compression ratio thereof becomes low.

Further, for example, there is conceived a method in which only items of confidential information are encrypted in a CSV file. However, a CSV file is variable-length data, and it is recognized as a column due to a delimiter such as ",". Meanwhile, as a result of encrypting items of confidential information, there is a possibility that, for example, a character code indicating a delimiter such as "," is created by accident. Therefore, the method of encrypting only items of confidential information has a problem that the data structure of the CSV file cannot be read out correctly. In this connection, there is also conceived a method in which the length (the number of characters) of data of each item is separately defined, and items of confidential information are encrypted with a fixed length. However, in the method of encrypting the items of confidential information with a fixed length, wasteful parts occur in the data of these items. As an example, there is considered a case where, with respect to columns (such as My Number, name, and sex) having a relatively shorter data length, encryption such as 128-bit AES (Advanced Encryption Standard) block encryption is performed for each predetermined size. In this case, in order to set the data of items to be encrypted to have a predetermined size, a padding bit is added on the data, and thus the data size of the CSV file is increased. For example, a My Number of 12 digits has 48 bits when the My Number has a BCD number. When 128-bit AES block encryption is performed on the 12-digit My Number, a padding bit is added on the My Number so that the My Number has 128 bits, and thus its data size becomes more than 2.5 times.

Further, for example, when confidential information is not included in a CSV file and a user has an authority to access the confidential information, there is conceived a method of separately acquiring only the confidential information. However, in this method, because only confidential information is acquired separately, there is no guarantee that the acquired information is the same data as that of originally needed to acquire. For example, there are documents that the originals thereof need to be saved. For example, as for business forms containing My Numbers, medical records at a hospital, and documents having preserving liability under the legal requirements, the originals of these documents are needed to be saved. As the saving of the originals, saving of these documents as electronic data is permitted. In this regard, the method of preparing confidential information and a CSV file individually and separately acquiring only the confidential information may be against the legal requirements and may pose a problem.

Further, for example, there is conceived a method of transmitting, according to a request, the encrypted dictionary 63 and the encoded data 61 to a requesting source. That is, there is conceived a method in which the encryption device 50 transmits records of employees other than employees designated as output subjects. However, the encoded data 61 also includes records of employees other than records of employees designated as output subjects, and thus there is a risk of information leakage.

On the other hand, the encryption system according to the present embodiment encodes a part of items such as the item of confidential information in a text file such as a CSV file with the unit of items of each record, and thus the text file 60 can be compressed with a high compression ratio. Further, the encryption system according to the present embodiment creates the encrypted dictionary 63 in which the encoded dictionary 62 having been used for encoding is encrypted with the unit of dictionary, and thus information can be protected in a flexible manner for each item. Further, because the encryption system according to the present embodiment does not add a padding bit or the like that causes an increase in the data size of the encoded data 61 at the time of encryption on the data of each item, so that it is possible to suppress an increase of the data size of the encoded data 61. In the encryption system according to the present embodiment, the encoded data 61 and the encrypted dictionary 63 are combined as one file to be stored, so that the preservation liability of the originals can be handled. In the encryption system according to the present embodiment, the decryption device 80 requests a part of records included in data to the encryption device 50. According to the request for a part of records included in the data, the encryption device 50 transmits an encoded part of records (the encoded data 64) of the encoded data 64 and the encrypted dictionary 63 to a requesting source. The decryption device 80 then decrypts the part of records (the encoded data 90) received from the encryption device 50 by using the encrypted dictionary 91. In this manner, only an encoded part of records of the encoded data 64 is transmitted from the encryption device 50 to the decryption device 80, and thus it is possible to suppress information leakage of data of other records of the encoded data 64 that are not transmitted to the decryption device 80.

Process Flow

Figure 7:
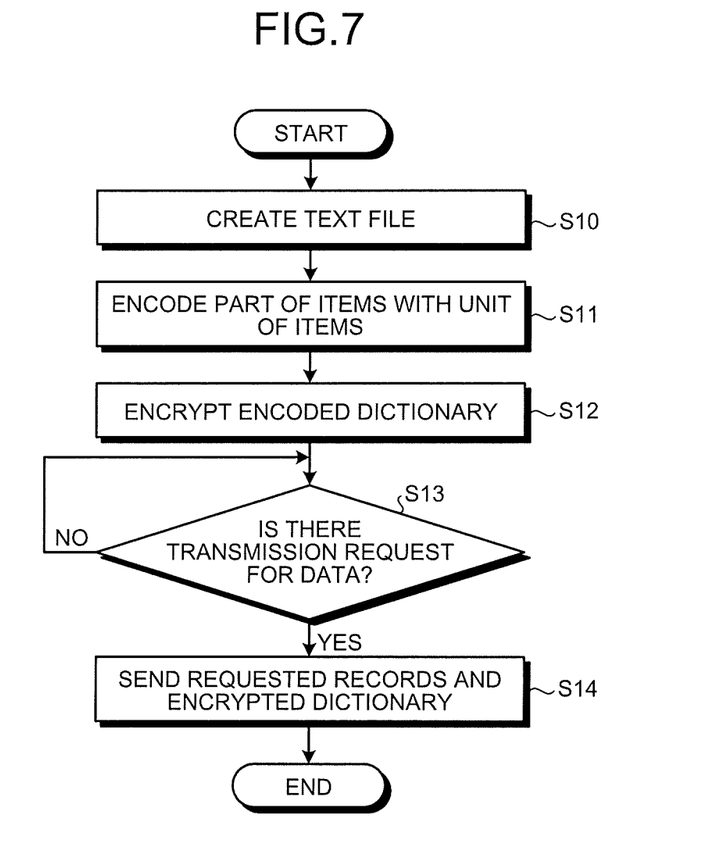
FIG. 7 is a flowchart illustrating an example of a procedure of an encryption process.

Next, flows of various processes performed by the encryption device 50 and the decryption device 80 according to the present embodiment are described. First, there is described a flow of an encryption process in which the encryption device 50 creates the encoded data 64 and the encrypted dictionary 63 and transmits these elements according to a request. FIG. 7 is a flowchart illustrating an example of procedures in the encryption process. The encryption process is performed at a predetermined timing such as a timing when creation of data to be printed on a business form is instructed.

As illustrated in FIG. 7, the first creation unit 70 creates the text file 60 including a plurality of records in which data of a plurality of items is delimited by a delimiter (S10). For example, the first creation unit 70 creates, as business-form data, the text file 60 such as a CSV file including a plurality of records having data of a plurality of items to be printed on a business form.

The encoding unit 71 encodes at least a part of items in the text file 60 with the unit of items of each record (S11). For example, the encoding unit 71 creates, from the text file 60, the encoded data 61 in which data of items of My Numbers designated as confidential information is encoded and the encoded dictionary 62.

The second creation unit 72 creates the encrypted dictionary 63 in which the encoded dictionary 62 (S12) is encrypted.

The transmission unit 73 determines whether a transmission request for data designated as output subjects of a business form has been received from the decryption device 80 (S13). When the request has not been received, (NO at S13), the process shifts to S13 again.

On the other hand, when the request has been received (YES at S13), the transmission unit 73 transmits an encoded part of records and the encrypted dictionary 63 to a requesting source (S14), and ends the process. For example, according to a request, the transmission unit 73 transmits, to the requesting source, the encoded data 64 having stored therein records of employees designated as output subjects among the encoded data 61 and the encrypted dictionary 63.

Figure 8:
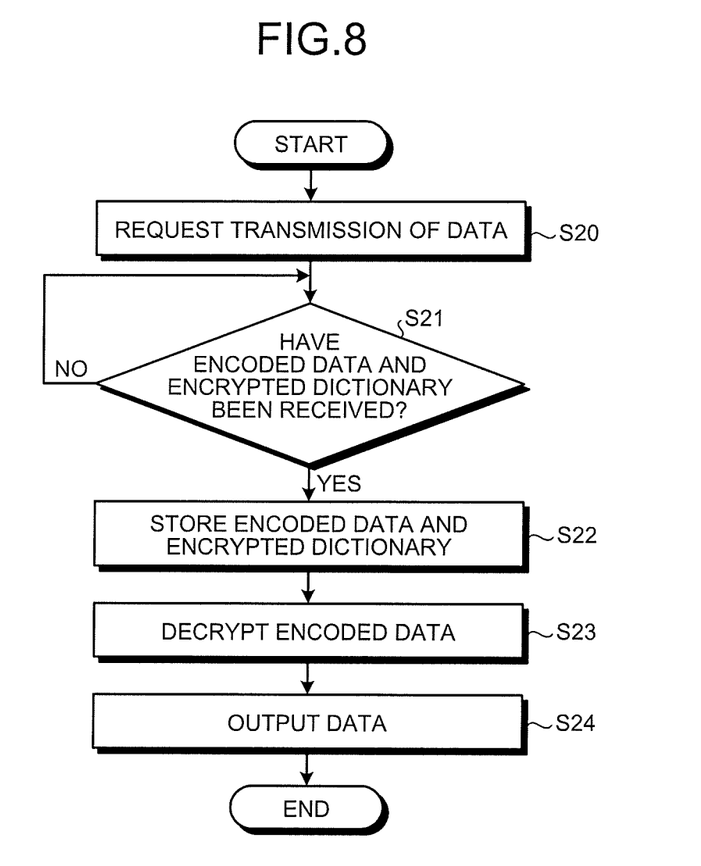
FIG. 8 is a flowchart illustrating an example of a procedure of a decryption process.

Next, a flow of a decryption process in which the decryption device 80 decrypts the encoded data 64 is described. FIG. 8 is a flowchart illustrating an example of a procedure of the decryption process. The decryption process is performed at a predetermined timing such as a timing when data handled to be an output subject of a business form, such as employees designated as output subjects of a business form is instructed.

As illustrated in FIG. 8, the requesting unit 100 requests transmission of data handled as an output subject of a business form to the encryption device 50 (S20). For example, the requesting unit 100 notifies the encryption device 50 of the employees as output subjects of a business form, and requests records of the employees as output subjects of a business form included in the text file 60.

The requesting unit 100 determines whether the encoded data 64 and the encrypted dictionary 63 have been received from the encryption device 50 (S21). When the encoded data 64 and the encrypted dictionary 63 have not been received (NO at S21), the process shifts to S21 again.

On the other hand, when the encoded data 64 and the encrypted dictionary 63 have been received (YES at S21), the requesting unit 100 stores the encoded data 64 and the encrypted dictionary 63, as the encoded data 90 and the encrypted dictionary 91 respectively, in the storage unit (S22). The decryption unit 101 decrypts the encoded data 90 to the text file 93 by using the encrypted dictionary 91 (S23).

The output unit 102 uses the text file 93 to create printing data, prints a business form (S24), and ends the process.

Effect

As described above, the encryption device 50 according to the present embodiment encodes at least a part of data (the text file 60) including a plurality of records having a plurality of items, with the unit of items of the respective records. The encryption device 50 creates the encrypted dictionary 63 in which the encoded dictionary 62 used for encoding with the unit of dictionary is encrypted. The decryption device 80 requests a part of records included in the data to the encryption device 50. The encryption device 50 transmits, according to a request for a part of records included in the data, an encoded part of records (the encoded data 64) and the encrypted dictionary 63 to a requesting source. The decryption device 80 decrypts a part of records (the encoded data 90) received from the encryption device 50 according to a request by using the encrypted dictionary 91. Due to this configuration, information can be provided while suppressing the risk of information leakage.

The encryption device 50 according to the present embodiment performs encoding while allocating a code to data of at least a part of items so that the code becomes unique with the unit of items, and creates the encoded dictionary 62 in which the code allocated with the unit of items and data are associated with each other. Due to this configuration, a short code can be allocated to each of encoding-subject items in an overlapping manner, so that data can be encoded with a high compression ratio in each of encoding-subject items.

The encryption device 50 according to the present embodiment calculates an appearance frequency with respect to a word or numeral included in the data of at least a part of items, and allocates a short code to a word or numeral having a high appearance frequency. Due to this configuration, a short code can be allocated to each of encoding-subject items in an overlapping manner, and thus data can be encoded with a high compression ratio in each of encoding-subject items.

Encryption Program

Figure 9:
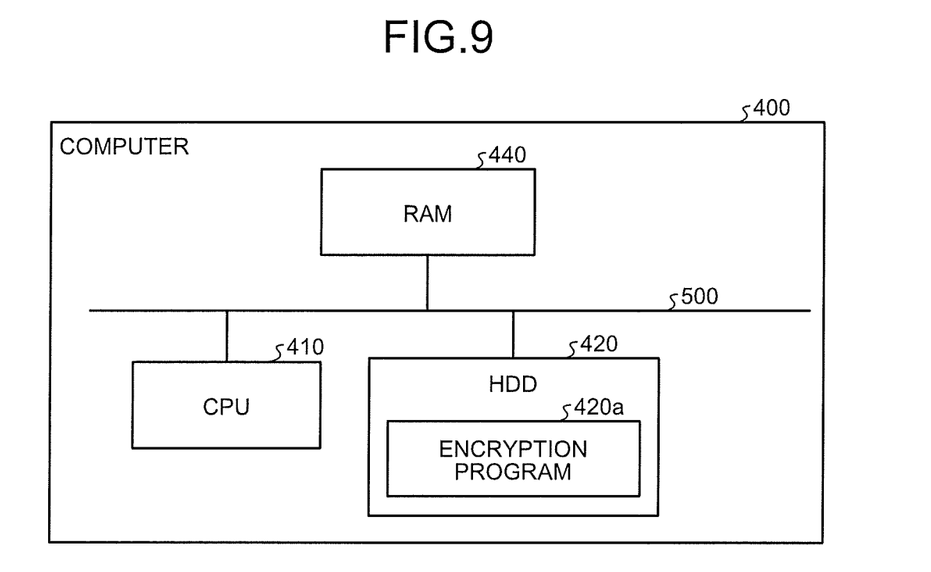
FIG. 9 is a diagram illustrating an example of a computer that executes an encryption program.

The various processes described in the above embodiment can be realized by executing a program prepared in advance by a computer system such as a personal computer and a workstation. In the following descriptions, there is described an example of a computer system that executes a program having functions identical to those of the embodiment described above. First, an encryption program for performing an encryption process is described. FIG. 9 is a diagram illustrating an example of a computer that executes an encryption program.

The computer 400 includes a CPU (Central Processing Unit) 410, an HDD (Hard Disk Drive) 420, a RAM (Random Access Memory) 440. The respective elements of 400 to 440 are connected to each other via a bus 500.

An encryption program 420*a* that exerts functions identical to those of the first creation unit 70 (the business-form processing unit 20), the encoding unit 71 (the encoding unit 21), the second creation unit 72 (the creation unit 22), and the transmission unit 73 (the transmission unit 23) is stored in advance in the HDD 420. The encryption program 420*a* can be separated as appropriate.

Further, the HDD 420 stores therein various types of information. For example, the HDD 420 stores therein various types of data used for an OS or for encoding.

Subsequently, the CPU 410 reads out the encryption program 420*a* from the HDD 420 to execute the encryption program 420*a*, thereby performing operations identical to those of the respective processing units in the embodiment described above. That is, the encryption program 420*a* performs operations identical to those of the first creation unit 70, the encoding unit 71, the second creation unit 72, and the transmission unit 73.

It is not always needed that the encryption program 420*a* described above is stored in the HDD 420 from the beginning.

Decryption Program

Figure 10:
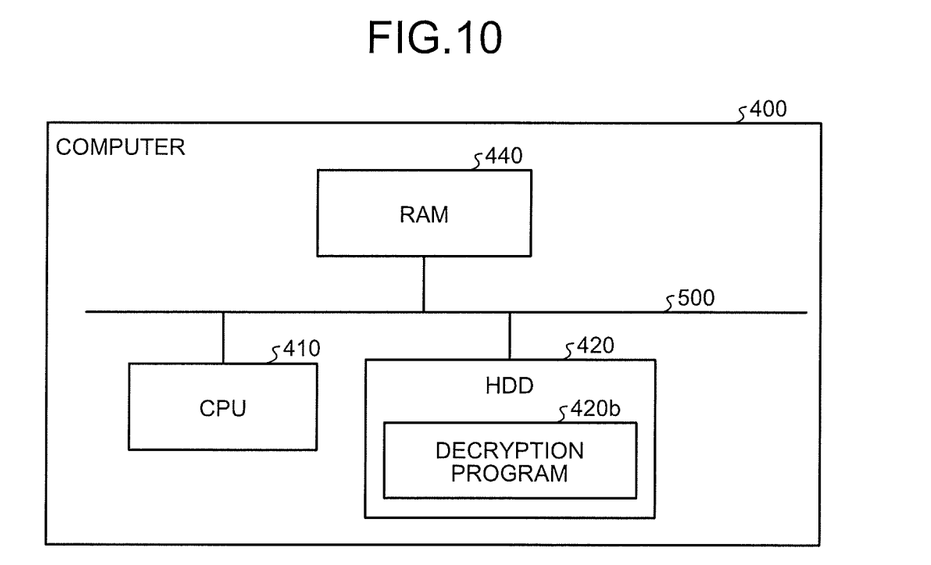
FIG. 10 is a diagram illustrating an example of a computer that executes a decryption program.

Next, a decryption program for performing a decryption process is described. FIG. 10 is a diagram illustrating an example of a computer that executes a decryption program. Parts identical to those illustrated in FIG. 9 are denoted with like reference signs and explanations thereof will be omitted.

As illustrated in FIG. 10, a decryption program 420*b* that exerts functions identical to those of the requesting unit 100 (the requesting unit 40), the decryption unit 101 (the decryption unit 41), and the output unit 102 (the printing processing unit 42) is stored in advance in the HDD 420. The decryption program 420*b* can be separated as appropriate.

The HDD 420 stores therein various types of information. For example, the HDD 420 stores therein an OS or various types of data used for searching.

The CPU 410 reads out the decryption program 420*b* from the HDD 420 to execute the decryption program 420*b*, thereby performing operations identical to those of the respective processing units in the embodiment. That is, the decryption program 420*b* performs operations identical to those of the requesting unit 100, the decryption unit 101, and the output unit 102.

It is not always needed that the decryption program 420*b* is stored in the HDD 420 from the beginning.

For example, the encryption program 420*a* and the decryption program 420*b* can be stored in a "portable physical medium" such as a flexible disk (HD), a CD-ROM, a DVD disk, an optical disk, and an IC card that are inserted into the computer 400. It is possible to configure that the computer 400 reads out the programs and executes them.

Further, these programs are stored in "other computers (or servers)" that are connected to the computer 400 via a public line, the Internet, a LAN, and a WAN. It is possible to configure that the computer 400 reads out the programs and executes them.

According to an embodiment of the present invention, information can be provided while suppressing the risk of information leakage.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An encryption system comprising:
   an encryption device comprising:
      a first memory; and
      a first processor coupled to the first memory, wherein the first processor executes a first process including:
         encoding at least a part of items of data, including a plurality of records having a plurality of items with a unit of items of respective records, so that a code becomes unique in a unit of items, creating an encoded dictionary in which a code allocated with the unit of items and the data are associated with each other;
         creating an encrypted dictionary in which the encoded dictionary having been used at the encoding is encrypted with a different encryption key per a unit of dictionary; and
         transmitting, according to a request for a part of records included in the data, the encoded part of records and the encrypted dictionary to a requesting source; and
   a decryption device comprising:
      a second memory; and
      a second processor coupled to the second memory, wherein the second processor executes a second process including:
         requesting a part of records included in the data to the encryption device; and
         decrypting the part of records received from the encryption device according to the request at the requesting by using the encrypted dictionary.

2. The encryption system according to claim 1, wherein the encoding calculates an appearance frequency with respect to a word or numeral included in the data of at least a part of items, and allocates a short code to a word or numeral having a high appearance frequency.

3. An encryption method executed by an encryption device and a decryption device, the method comprising:
   by the encryption device:
      encoding at least a part of items of data, including a plurality of records having a plurality of items with a unit of items of respective records, so that a code becomes unique in a unit of items, creating an encoded dictionary in which a code allocated with the unit of items and the data are associated with each other;
      creating an encrypted dictionary in which the encoded dictionary having been used at the encoding is encrypted with a different encryption key per a unit of dictionary; and
      transmitting, according to a request for a part of records included in the data, the encoded part of records and the encrypted dictionary to a requesting source; and
   by the decryption device:
      requesting a part of records included in the data to the encryption device; and
      decrypting the part of records received from the encryption device according to the request by using the encrypted dictionary.

4. An encryption device comprising:
   a processor that executes a process including:
      encoding at least a part of items, of data including a plurality of records having a plurality of items with a unit of items of respective records, so that a code becomes unique in a unit of items, creating an encoded dictionary in which a code allocated with the unit of items and the data are associated with each other;

creating an encrypted dictionary in which the dictionary having been used at the encoding is encrypted with a different encryption key per a unit of dictionary; and transmitting, according to a request for a part of records included in the data, the encoded part of records and the encrypted dictionary to a requesting source.

5. A non-transitory computer-readable recording medium having stored therein a program that causes a computer to execute a process comprising:

encoding at least a part of items of data, including a plurality of records having a plurality of items with a unit of items of respective records, so that a code becomes unique in a unit of items, creating an encoded dictionary in which a code allocated with the unit of items and the data are associated with each other;

creating an encrypted dictionary in which the dictionary having been used at the encoding is encrypted with a different encryption key per a unit of dictionary; and transmitting, according to a request for a part of records included in the data, the encoded part of records and the encrypted dictionary to a requesting source.

6. The encryption system according to claim 1, wherein the first process further including storing the encoded data and the encrypted dictionary being combined as one file.

\* \* \* \* \*